United States Patent [19]

Wilhelm

[11] Patent Number: 4,787,420

[45] Date of Patent: Nov. 29, 1988

[54] PLUGGING APPARATUS AND METHOD USING A HYDRAULICALLY ASSISTED PLUG EXPANDER

[75] Inventor: John J. Wilhelm, New Kensington, Pa.

[73] Assignee: Westinghouse Electric Corp., Pittsburgh, Pa.

[21] Appl. No.: 936,558

[22] Filed: Dec. 1, 1986

[51] Int. Cl.⁴ ............................................. F16L 55/12
[52] U.S. Cl. ..................................................... 138/89
[58] Field of Search ................. 29/421 R, 507, 522 A, 29/523; 138/89, 90, 92, 97; 220/234, 239; 411/19

[56] References Cited

U.S. PATENT DOCUMENTS

| | | | |
|---|---|---|---|
| 1,646,431 | 10/1927 | Tomkinson | 411/19 |
| 3,505,846 | 4/1970 | Smida | 138/89 X |
| 3,525,365 | 8/1970 | Meulendyk et al. | |
| 3,691,609 | 9/1972 | Ice, Jr. et al. | 138/89 X |
| 4,069,573 | 1/1978 | Rogers, Jr. et al. | 29/523 X |
| 4,125,937 | 11/1978 | Brown et al. | 29/421 R X |
| 4,366,617 | 1/1983 | Nanstiel et al. | 29/727 |
| 4,369,662 | 1/1983 | Rieben et al. | 138/89 |
| 4,390,042 | 6/1983 | Kucherer et al. | 138/89 |
| 4,393,564 | 7/1983 | Martin | |
| 4,393,674 | 7/1983 | Rasmussen | 29/421 R X |
| 4,436,117 | 3/1984 | Martin | |
| 4,502,308 | 3/1985 | Kelly | 29/421 R X |
| 4,502,511 | 3/1985 | Zafred | 138/89 |
| 4,557,128 | 12/1985 | Costabile | 29/421 R X |
| 4,581,801 | 4/1986 | Kobuck et al. | |
| 4,637,436 | 1/1987 | Stewart, Jr. et al. | 138/89 |

FOREIGN PATENT DOCUMENTS

| | | |
|---|---|---|
| 0044982 | 2/1982 | European Pat. Off. |
| 0058850 | 9/1982 | European Pat. Off. |
| 0120277 | 3/1983 | European Pat. Off. |
| 2514099 | 4/1983 | France |
| 59-027195 | 6/1982 | Japan |
| 61-116294 | 6/1986 | Japan |
| 567666 | 2/1945 | United Kingdom ................ 411/19 |
| 1211810 | 11/1970 | United Kingdom |

Primary Examiner—Mark J. Thronson

[57] ABSTRACT

A plugging apparatus and method utilizing a plug expander that is hydraulically assisted. The apparatus generally comprises a plug shell having a closed end and an open end, an expander element contained within the shell which is movable between the open and closed ends thereof for wedgingly engaging the shell and radially expanding it, and an expansion mechanism including a combination pull rod and expansion mandrel that is connected to the expander element contained within the shell. A source of pressurized hydraulic fluid is connected to the combination pull rod and mandrel. The mandrel is capable of conducting pressurized hydraulic fluid between the closed end of the shell and the expander element in order to facilitate the movement of the expander element toward the open end of the shell. The invention may be used to conveniently and effectively plug heat exchanger tubes of either nuclear or fossil fuel steam generators.

26 Claims, 2 Drawing Sheets

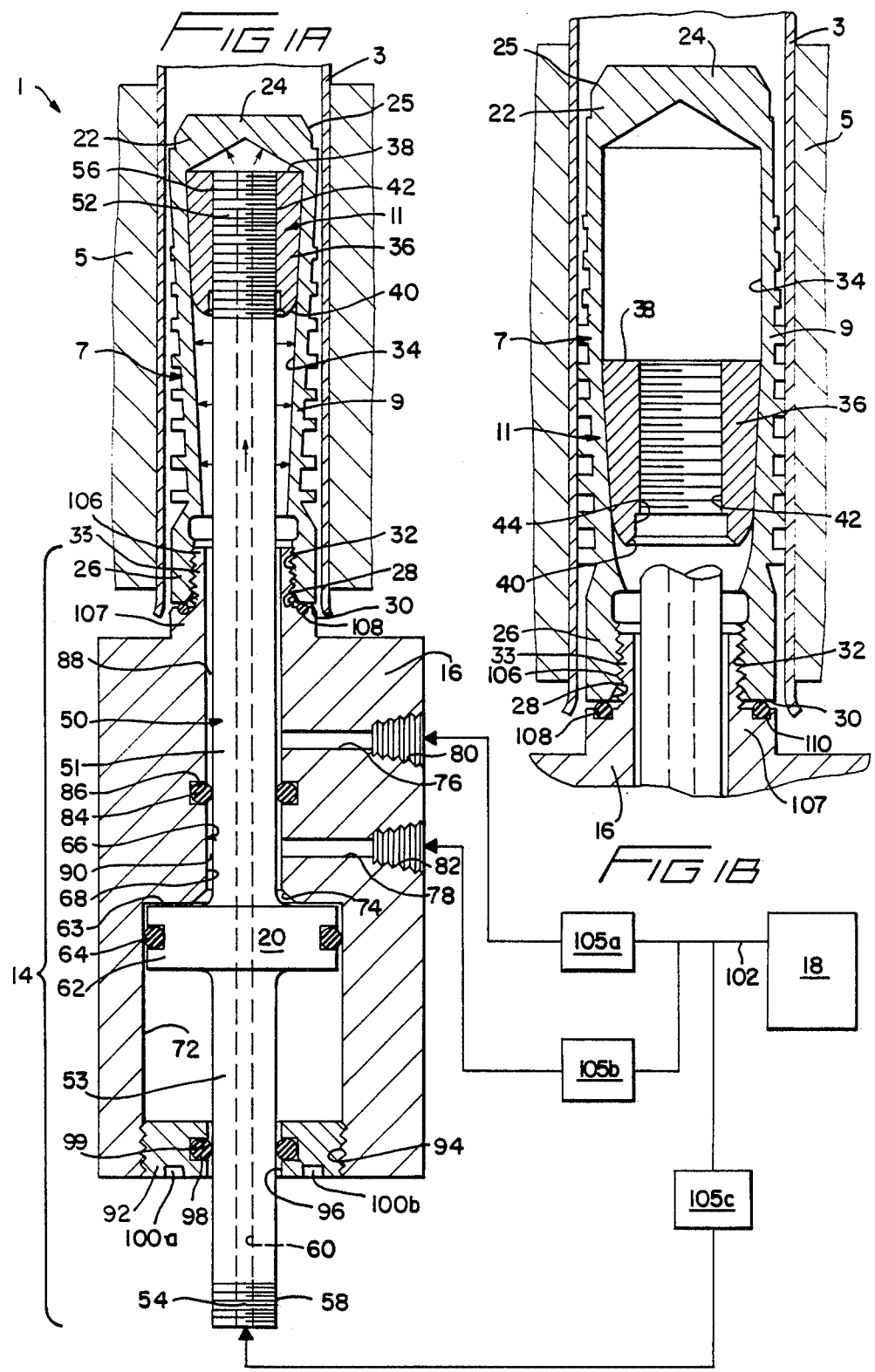

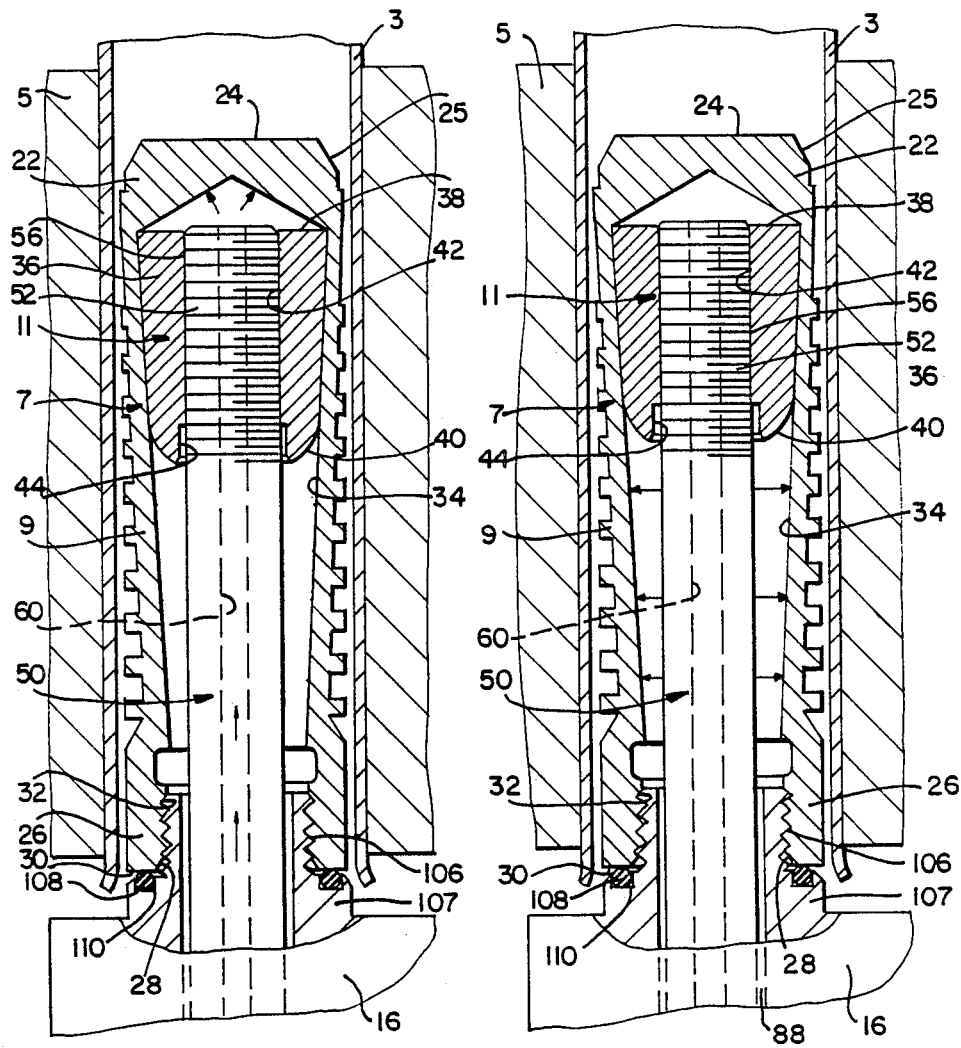

PLUGGING APPARATUS AND METHOD USING A HYDRAULICALLY ASSISTED PLUG EXPANDER

BACKGROUND OF THE INVENTION

1. Field of the Invention

This invention generally relates to plugging tubes by means of a radially expandable plug having an expander element, and specifically concerns both an apparatus and a method for plugging relatively small diameter heat exchange tubes in either a fossil fuel or nuclear steam generator.

2. Description of the Prior Art

Plugging devices for plugging the heat exchanger tubes of steam generators are known in the prior art. Often, such devices are used to seal off one or more of the U-shaped heat exchanger tubes contained within a nuclear steam generator when the walls of these tubes become degraded below acceptable limits. If such tubes are not plugged or repaired, they may crack and allow radioactive water from the primary side of the generator to leak into the non-radioactive water in the secondary side. This, in turn, could result in the radioactive contamination of the non-radioactive steam that Westinghouse-type nuclear steam generators provide to turn the turbines of the electric generators of the plant. Hence the plugging of potentially degraded heat exchanger tubes is an important maintenance operation.

The plugs used in such prior art devices generally comprise a tubular shell that is open on one end and closed at the other end, and which contains a frustoconically shaped expander member. In one type of prior art plug, the expander element is a conical wedge shaped like a common cork used to seal a bottle, and is disposed completely within the interior of the shell with its larger circular end facing the inner surface of the closed distal end of the plug shell. Instead of being cylindrical, the interior walls of the shell are slightly tapered by increasing the thickness of the shell walls from the distal closed end to the proximal open end. When the cork-shaped wedge is forcefully pulled from the closed end toward the open end of the shell, it will radially expand the plug into sealing engagement with the inner wall of a tube by a wedging action. Such a plug design is completely described in U.S. Pat. No. 4,390,042 invented by Harvey D. Kucherer and assigned to the Westinghouse Electric Corporation. In this particular plug design, the cork-shaped expander wedge is forcefully pulled from the distal to the proximal end of the plug shell by means of a pull-rod that is connected to the expander member on one end and to a hydraulic ram on the other end.

In most instances, this particular plug design is capable of reliably and conveniently plugging the open ends of a potentially degraded U-shaped tube whose ends are surrounded by the thick steel tubesheet that divides the primary from the secondary side of the steam generator. The forceful pulling of the cork-shaped expander member along the axis of the shell not only radially expands the wall of the shell outwardly as the member is wedgingly drawn toward the proximal end of the shell, but further applies an extruding force to the metallic walls of the shell along the longitudinal axis of the tube.

In a variation of this design, an explosive charge is used in lieu of a pull-rod to move the cork-shaped wedge along the longitudinal axis of the tube shell. In such plugs, the expansion member is situated near the open end of the tubeshell, and the explosive charge is disposed between the proximal end of the shell and the top surface of the expansion member. When the charge is detonated, the cork-shaped wedge is pushed along the longitudinal axis of the shell until it abuts the closed distal end of the plug.

Unfortunately, there are certain mechanical limitations associated with these prior art plug designs that interfere with their usefulness in certain applications. For example, in plugs wherein a pull-rod is used to draw the cork-shaped wedge against the internally tapered walls, there is a limit as to the inner diameter of the tubes that such plugs can reliably seal. In nuclear steam generators utilizing heat exchanger tubes having inner diameters of approximately 0.50 inches or greater, this mechanical limitation usually poses no problem. On the other hand, for tubes whose inner diameter is less than 0.50 inches, it becomes increasingly difficult to design a pull-rod capable of withstanding the tensile force necessary to draw the cork-shaped wedge throughout the entire longitudinal axis of the tubeshell. Even when the pull-rod is formed from the strongest commercially available tool metals, such as Vascomax ®, it will still have a tendency to break off in small diameter plugs since its own external diameter can be no larger than the minimum internal diameter of the tapered interior of the plug shell, and since the tensile strength of any material decreases exponentially with its diameter. One way of solving this problem is to reduce the angle of both the cork-shaped wedge and the tapered walls within the plug shell. However, to obtain the same quality of seal, the plug must be lengthened. While the use of longer plugs poses no problem in tubes centrally located in the tubesheet, they are difficult if not impossible to use in the peripheral tubes of the tubesheet due to the long stroke the ram-operated pull-rod member has to make to completely pull the wedge through the plug shell.

Still another limitation of this prior art design arises from the size of the hydraulic ram that is required to apply the tensile force necessary to draw down the cork-shaped wedge. Such rams typically have a minimum diameter of about 4.5 inches. Yet, around the periphery of the tubesheet, a clearance of only one half inch exists between the tube and the bowl-shaped wall that forms the primary side of the nuclear steam generator. Hence, it is difficult to provide a ram that is powerful enough to generate the required tensile force yet compact enough to be easily manipulated in the limited space surrounding the peripheral heat exchanger tubes.

In an attempt to solve the foregoing problems the previously mentioned explosive-type plugs were developed. But while the use of explosives obviates the need for pull-rods and hydraulic rams, they proven in practice to generate at least as many problems as they solve. To minimize the amount of generator down-time necessary to complete the plugging operation, a group of explosive plugs are usually positioned and detonated simultaneously. However, the simultaneous detonation of a plurality of such plugs generates powerful mechanical shock waves that can break weakened sections of the U-shaped heat exchanger tubes that are not being plugged, thereby defeating the overall purpose of the plugging operation. These shock waves can also damage the sensitive monitoring instrumentation present on all nuclear steam generators. Additionally, the special arrangements that are necessary for the transportation of such explosively operated devices, and the necessity for licensed explosives technicians to install such plugs has made them substantially more expensive to use than plugs which are expanded by a hydraulically operated pull-rod.

Clearly, there is a need for a new type of plugging device that is capable of reliably plugging small diameter as well as large diameter heat exchanger tubes in steam generators. Ideally, such a device should be capable of installing plugs even in heat exchanger tubes of limited access, such as the tubes situated around the periphery of the tubesheet.

SUMMARY OF THE INVENTION

In its broadest sense, the invention is an apparatus for plugging a conduit, such as an Inconel ® tube, that comprises a plug shell having a closed end and an open end, an expander element contained within the shell that is movable across said shell between the open and closed ends thereof for wedgingly engaging and spreading the shell and thereby radially expanding it, and an expansion means including a source of pressurized hydraulic fluid for facilitating the movement of the expander element by hydraulically expanding the interior of the shell.

The expansion means may include a pull-rod that is detachably connected to the expander element for applying a complementary pulling force to the expander element when the pressurized hydraulic fluid is introduced in the interior of the shell. The pull-rod may include a piston face in fluid communication with the source of pressurized fluid for generating the pulling force on the pull-rod. In one method of the invention, the expansion means may conduct the pressurized fluid in the interior of the shell between the expander element and the closed ends thereof in order to hydraulically push the expander element like a piston from the closed to the open end of the shell. In a variation of this method the expander element may be moved by the simultaneous application of a hydraulic force from the pressurized fluid, and a pulling force from the rod. In another method of the invention, the pressurized fluid may be conducted to all points of the interior of the shell while the rod applies a pulling force. When this method is used, the cross sectional area of the expander element facing the closed end of the shell may be made larger than the cross sectional area of the end of the expander element facing the closed end of the shell, so that a net hydraulic force is generated by the pressurized fluid that assists the pulling force applied by the rod in moving the expander element. In a variation of this method, pressurized fluid may be conducted only between the expander element and the open end of the shell in order to expand the shell, while a pulling force is applied by the rod means to move the expander element toward the open end of the shell.

The pull-rod may constitute a tubular mandrel connected to the source of pressurized hydraulic fluid. This mandrel may be detachably connectable with a bore that extends completely through the expander element for conducting pressurized fluid between the element and the closed end of the shell. Additionally, both the mandrel and the bore may include mating threads so that the mandrel may be easily connected with the expander element prior to the expansion operation, and then easily disconnected therefrom after the plug shell has been expanded into sealing engagement with the tube.

The apparatus and method of the invention provide a convenient and reliable way to plug both small diameter and peripherally located tubes within the tubesheet of a steam generator, whether fossil fuel or nuclear. The use of the expander element as a hydraulic piston within the plug shell, and the provision of a piston face on the pull-rod minimizes or eliminates the need for a large hydraulic ram beneath the plug shell during the plugging operation, and results in plugs which are reliably and easily installed in their respective tubes without any of the aforementioned disadvantages associated with prior art plugs and plugging methods.

BRIEF DESCRIPTION OF THE SEVERAL FIGURES

FIG. 1A is a cross-sectional side view of the plugging apparatus of the invention implementing a first embodiment of the method of the invention;

FIG. 1B is a cross-sectional side view of a plug used in connection with the plugging apparatus of the invention, shown in an expanded state;

FIG. 2 is a cross-sectional side view of a plug used in connection with the plugging apparatus of the invention, illustrating a second alternative embodiment of the method of the invention, and FIG. 3 is a cross-sectional side view of the plug illustrated in FIG. 2, illustrating still another embodiment of the method of the invention.

DETAILED DESCRIPTION OF THE PREFERRED EMBODIMENT

With reference now to FIGS. 1A and 1B, wherein like reference numerals designate like components of the invention throughout all of the several figures, the plugging apparatus 1 of the invention is particularly adapted for plugging a tube 3 in the tubesheet 5 of a nuclear steam generator. Generally, the plugging apparatus 1 comprises a plug 7, and an expansion assembly 14. The plug is formed from a tapered, hollow plug-shell 9 that contains a cork-shaped expander element 11. The expansion assembly 14 includes a hydraulic inlet block 16 that is connected to a source of pressurized fluid 18 for hydraulically expanding the shell 9, and a pull-rod mechanism 20 that is detachably connected to the expander element 11 of the plug 7 for applying a tensile force onto the element 11 and drawing it down into the position illustrated in FIG. 1B. As will be described in more detail hereinafter, the pressurized hydraulic fluid which may be conducted to one or more regions of the interior of the shell 9 always serves to expand the walls of the shell 9 away from the outer surface of the expander element 11, thereby reducing the amount of tensile force that the pull-rod mechanism 20 must exert onto the expander element 11 to draw it down into the position illustrated in FIG. 1B.

Turning now to a more detailed description of the plug 7, the shell 9 includes a distal closed end 22 that terminates in a wall 24 having a chamfered end 25 for facilitating the insertion of the shell 9 into the open end of a tube 3. This shell 9 further includes a proximal open end 26 that terminates in a circular opening 28 circumscribed by a flat annular wall 30. In the preferred embodiment, the circular opening 28 leads into a threaded bore 32 that in turn communicates with the interior of the shell 9. This threaded bore 32 is matable with the threaded end of a nipple 33 that extends out of the top face of the inlet block 16.

Circumscribing the hollow interior of the shell 9 are tapered inner walls 34. These walls 34 are circular in cross-section with respect to the longitudinal axis of the shell 9. The walls 34 converge to their minimum extent at the threaded bore 32 located at the proximal end of the shell 9, and diverge to their maximum extent at the wall 24 which is located at the distal closed end 22 of the shell 9. The expander element 11 is formed from a cork-shaped body 36, the conical taper of which is preferably equal to the conical taper of the inner walls 34. This substantial equivalence in the taper of the cork-shaped body 36 and taper of the inner walls 34 of the shell 9 advantageously allows a large portion of the outer surface of the cork-shaped body 36 to engage the tapered inner walls 34 of the shell 9 in sealing engagement when the expander element 11 is drawn downwardly toward the threaded bore 32. It should be noted that the flat, circular distal end 38 of the cork-shaped body 36 has a larger cross-sectional area with respect to the longitudinal axis of the shell 9 for a purpose that will become evident presently. Finally, the cork-shaped body 36 includes a centrally disposed, threaded bore 42 circumscribed by an annular recess 44.

Turning now to a more detailed description of the expansion assembly 14, this portion of the invention includes a pull-rod member 50 that can also function as a hydraulic mandrel, as well as be seen shortly. Pull-rod member 50 has an upper section 51 that terminates in a distal end 52, and a lower section 53 that terminates in proximal end 54. The distal and proximal ends 52, 54 each terminate in threads 56, 58. The threads 58 of the distal end 52 are matable with the threaded bore 42 of the expander element 11. The threads 56 of the proximal end 54 are matable with a fitting (not shown) for connecting a concentrically aligned bore 60 that runs completely along the longitudinal axis of the pull-rod member 50 with the source 18 of pressurized fluid. The provision of the bore 60 allows the pull-rod member 50 to conduct pressurized hydraulic fluid from the source 18 to the space between the wall 24 that defines the closed end 22 of the shell 9, and the flat, circular distal end 38 of the expander element 11 (see flow arrows). Hence, the member 50 can function as a hydraulic mandrel within the plugging apparatus 1, as well as a pull-rod. Concentrically disposed around the middle of the pull-rod member 50 is an integrally formed piston 62. This piston 62 is in turn circumscribed by one or more sealing rings 64 for preventing pressurized hydraulic fluid from leaking out of the inlet block 16.

The inlet block 16 includes a vertically disposed bore 66 having an upper portion 68, and an enlarged lower portion 72 for slidably housing the upper rod section 51, and the integrally formed piston 62 of the pull-rod member 50. The enlarged lower portion 72 serves as a hydraulic cylinder that houses the piston 62, and sealingly engages the ring 64 that circumscribes the piston 62. The vertically disposed bore 66 includes a conical portion 74 that melds in with the enlarged lower bore 72. In addition to the vertically disposed bore 66, the inlet block 16 includes upper and lower horizontal bores 76 and 78, respectively. Each of these horizontal bores 76 and 78 includes a threaded end 80 and 82 for receiving a hydraulic fitting (not shown) that ultimately connects the bores 76 and 78 with the source 18 of pressurized fluid. An O-ring 84 seated in an annular groove 86 circumscribes the upper section 51 of the pull-rod member 50 between the upper and lower horizontal bores 76 and 78. The O-ring 84 hydraulically isolates the upper annular space 88 defined between the bore 66, and the upper section 51 of the pull-rod member 50 from the lower annular space 90 defined between the bore 66 and the proximal end of the upper section 51 of member 50.

The bottom end of the inlet block 16 includes a threaded fitting 92 that is engageable with threads 94 present on the bottom end of the enlarged lower bore 72. Disposed at the center of the threaded fitting 92 is a circular opening 96 that is concentrically aligned with the lower section 53 of the pull-rod member 50. This opening 96 is circumscribed by an O-ring 98 seated within an annular recess 99 that slidably and sealingly engages the lower section 53 of the pull-rod member 50. The purpose of the O-ring 98 is to prevent any hydraulic fluid that manages to get past the sealing ring 64 of the piston 62 from exiting the inlet block 16. In the preferred embodiment, the threaded fitting 92 includes a pair of opposing dimples 100a, 100b that allows the prongs of a wrench (not shown) to install or remove the fitting 92 from the bore 94.

On the right-hand side of the inlet block 16, the threaded ends 80 and 82 of the upper and lower horizontal bores 76 and 78 are fluidly connected in parallel to the source 18 of pressurized fluid, as is the concentrically aligned bore 60 present in the pull-rod member 50. Each of these parallel connections includes a pressure reducing control valve 105a, 105b, and 105c so that the pressure of the hydraulic fluid entering the upper bore 76, lower bore 78, and concentric bore 60 may be selectively adjusted. Such pressure reducing control valves are commercially available items well-known in the art. In the preferred embodiment, the source 18 of pressurized fluid is preferably a Haskel Hydroswage ® brand hydraulic expander manufactured by Haskel, Inc. of Burbank, Calif.

Turning finally to the top end of the inlet block 16, the block 16 includes the previously mentioned threaded nipple 33 (best seen in FIG. 1B). This nipple 33 extends out of an integrally formed, annular spacing collar 107 that is concentrically aligned with the pull-rod member 50. Preferably, the outer diameter of the spacing collar 107 is no greater than the outer diameter of the flat annular wall 30 that circumscribes the circular opening 28 of the plug 7. The upper edge of the spacing collar 106 is chamfered as shown, and further includes a sealing ring 108 seated within an annular groove 110. In the preferred embodiment, the depth of the annular groove 110 is about 60 to 70% of the vertical height of the sealing ring 108. So proportioned, the annular groove 110 is deep enough to prevent the sealing ring from blowing out during the application of maximum expansion pressures, yet shallow enough so that the compressive force applied by the threaded nipple 30 when the plug 7 is screwed onto the block 16 never completely overcomes the resiliency of the ring 108, thus assuring that all of this compressive force will be used to sealingly engage the annular wall 30 of the plug 7 against the ring 108.

In the method of the invention, the plug 7 is attached to the expansion assembly 14 by inserting the distal end 52 of the pull-rod member 50 through the proximal open end 26 of the shell 9. The annular recess 44 that circumscribes the proximal end of the threaded bore 42 of the expander element 11 helps the operator to properly align the threaded bore 42 with the threads 56 present on the distal end 52 of the pull-rod member 50. Once such proper alignment has been attained, the operator hand-screws the expander element 11 of the plug 7 over the distal end 52 of the pull-rod member 50. When the distal end 52 is about half-way screwed into the bore 42 of the expander element 11, the threaded nipple 33 will begin to screw into the threaded bore 32 present at the proximal open end 26 of the plug 7. The operator continues to screw the plug 7 into the expansion assembly 14 until the flat annular wall 30 of the plug 7 engages the sealing ring 108 that circumscribes the spacing collar 107 of the inlet block 16. Normally, no wrenches or other tools will be required to screw the plug 7 against the sealing ring 108; the applicants have found that only a hand-tight screwing together is necessary in order to contain pressures within the shell 9 of up to 28,000 psi.

Once the plug 7 has been installed onto the expansion assembly 14, the plugging apparatus 1 is inserted into the open end of a tube 3 in the position illustrated in FIG. 1A. At this juncture, the operator may execute either one of three embodiments of the method of the invention. The first of these methods is illustrated in FIG. 1A. In this method, the operator simultaneously conducts pressurized hydraulic fluid from the source 18 through the bore 60 of the pull-rod member 50, as well as the upper and lower horizontal bores 76 and 78. Pressurized fluid from the bores 60 and 16 accordingly enters all of the interior regions of the shell 9, both in the small space between the wall 24 of the closed distal end 22 of the plug 7, and the circular distal end 38 of the expander element 11, as well as in the space between the rounded, proximal end 40 of the expander element 11, and the circular opening 28 in the shell 9. The pressurized hydraulic fluid from the bores 60 and 76 has two effects. First, it serves to slightly expand the interior of the shell 9. Second, because the area of the circular distal end 38 of the expander element 11 is larger than its rounded, proximal end 40, and because the conically shaped walls of the expander element 11 are sealingly engaged to the tapered walls 34 within the shell 9, this hydraulic fluid creates a net hydraulic force that urges the expander element 11 downwardly. At the same time, pressurized fluid from the bore 78 flows into the annular space 90, and applies pressure against the upper face 63 of the piston 62, thereby pushing the piston 62 downwardly and generating a tensile force on the upper section 51 of the pull-rod member 50. The end result of the radial expansion of the shell 9, the net hydraulic force that urges the expander element 11 downwardly, and the tensile force exerted onto the element 11 by the pull-rod member 50 is that the expander element is pushed down into the position illustrated in FIG. 1B.

The second preferred embodiment of the method is illuminated in FIG. 2. Here, the operator admits pressurized hydraulic fluid from the source 18 only through the bore 60 of the pull-rod, thereby relying upon a piston-like action of the expander element to push the expander element 11 into the final position illustrated in FIG. 1B. When this particular method is employed, it should be noted that the pressurized hydraulic fluid pushes the cork-shaped expander element 11 downwardly by applying both a vertically oriented force against the flat, circular distal end 38 of the element, and a radially expansive force against the tapered inner walls 34 of the shell 9 that facilitates the downward movement of the element 11. In a variation of this embodiment, the operator may simultaneously conduct pressurized hydraulic fluid through the bore 78, thereby pushing piston 62 downwardly and creating a tensile force in the pull-rod member 50 that assists the pressurized hydraulic fluid bearing against the distal end 38 of the element 11 in moving the element downwardly.

The third preferred embodiment of the method is illustrated in FIG. 3. In this embodiment, the operator admits pressurized fluid into bores 76 and 78. The fluid flowing out of bore 76 serves to radially expand the interior of the shell 9 in the region below the rounded, proximal end 40 of the expander element 11 as indicated. This fluid also applies a pressure against the rounded, proximal end 40 of the element 11 that urges the element upwardly. However, this force is more than counteracted by the tensile force applied to the element 11 by the pull-rod member 50 as a result of the fluid from bore 78 applying pressure onto the upper surface 63 of the piston 62. The end result is that the element 11 is moved into the position illustrated in FIG. 1B.

While all three embodiments of the method have been described as though the pressure-reducing valves 105a, 105b and 105c are used merely as fluid switches, it should be noted that the operator has the option of varying the pressure of the fluid he admits through the bores 60, 76 and 78. This feature advantageously allows the operator to empirically determine and use whatever balance of pressures through bores 60, 76 and 78 are necessary to successfully move the element 11 downwardly so that the lands on the exterior of the shell 9 are radially expanded into sealing engagement with the inside surface of the tube 3.

When the shell 9 is formed from Inconel ®, the pressures of the hydraulic fluids flowing through the bores 60, 76 and 78 will generally range from between about 12,000 to 22,000 psi, and more preferably from between 17,000 psi and 22,000 psi.

While the invention has been specifically described in the context of plugging the heat exchange tubes of a nuclear steam generator, the invention is equally applicable to the heat exchange tubes of a fossil fuel generator, and may be used to plug virtually any tube in any environment.

I claim:

1. A plugging apparatus for plugging a conduit, comprising:
   (a) a plug shell having a closed end and an open end;
   (b) an expander element contained within the shell and sealingly engaged therein that is movable between the closed end and the open end and that wedgingly engages the shell and radially expands it when so moved, and
   (c) an expansion means including both a source of pressurized hydraulic fluid for facilitating said movement of the expander element by conducting said fluid to the shell interior between the closed end of the shell and the expander element, thereby expanding the shell while urging the expander element toward the open end of the shell, and a rod means for pulling the expander element toward the open end of the shell, whereby said expansion means moves the expander element by the application of both the hydraulic force from the pressurized fluid, and the pulling force from said rod means.

2. The apparatus of claim 1, wherein the expander element is moved across said shell substantially as a result of the hydraulic force.

3. The apparatus of claim 1, wherein the radial expansion of the plug shell effected by the pressurized hydraulic fluid substantially reduces the amount of pulling force that the rod means must apply to the expander element to move said element.

4. The apparatus of claim 1, wherein the expansion means further includes a sealing means for sealing the open end of the plug shell, and wherein said expansion means conducts pressurized hydraulic fluid within the shell between the open end of the shell and the expander element, as well as between the closed end of the shell and the expander element.

5. The apparatus of claim 1, wherein said rod means is a hydraulic mandrel that is detachably connectable to the expander element, for conducting said pressurized fluid.

6. The apparatus of claim 1, wherein the conduit is circumscribed at least in part by a structure that is elastically deformable.

7. The apparatus of claim 1, wherein the conduit and plug shell are both formed from an alloy containing nickel, and wherein the region of the conduit being plugged is circumscribed by a tubesheet.

8. A plugging apparatus for plugging a conduit comprising:
   (a) a plug shell having a closed end and an open end, and an interior defined by tapered walls;
   (b) an expander element contained within the plug shell interior and sealingly engaged around said tapered walls, said element being movable across the plug shell between the closed and open ends of the shell when a force is applied to said element for wedgingly spreading said tapered interior walls and radially expanding the shell, and
   (c) an expansion means including a mandrel connected to a source of pressurized hydraulic fluid for facilitating the movement of the expander element across the plug shell by conducting said fluid to the shell interior, thereby spreading said tapered walls and reducing the amount of force necessary to move said element, wherein said mandrel is detachably connectable to said expander element, and wherein said mandrel includes a piston face in fluid communication with said pressurized hydraulic fluid for generating and applying a pulling force onto said expander element.

9. The apparatus of claim 8, wherein said expander element includes a bore for conducting said pressurized fluid between the closed end of the plug shell and the expander element.

10. The apparatus of claim 9, wherein said expander element includes a bore that extends completely through said element, and wherein said mandrel is sealingly connectable to said bore of said expander element for conducting pressurized fluid between said expander element and the closed end of the plug shell in order to apply a hydraulic force to the expander element that urges it to move across the plug shell and to wedgingly spread said tapered interior walls of said shell, thereby radially expanding said shell.

11. The apparatus of claim 10, wherein said expander element is moved across the shell substantially as a result of said hydraulic force.

12. The apparatus of claim 8, wherein said expander element is moved across the shell substantially as a result of said pulling force.

13. The apparatus of claim 10, wherein said expansion means includes a sealing means for sealing the open end of the plug shell, and said expansion means also conducts pressurized fluid between the expander element and the open end of the plug shell, and wherein the area of the expander element on the side facing the sealed open end is smaller than the area of the side facing the closed end so that a net hydraulic force urges the expander element across the plug shell.

14. The apparatus of claim 13, wherein said expander element is moved across the shell substantially as a result of the net hydraulic force.

15. The apparatus of claim 13, wherein said expander element is moved across the shell substantially as a result of said pulling force.

16. The apparatus of claim 8, wherein said expansion means includes a sealing means for sealing the open end of the plug shell, and wherein said expansion means conducts pressurized fluid only between the open end of the plug shell and the expander element, and wherein the mandrel applies a pulling force to the expander element that is sufficient to overcome any net hydraulic forces urging said element away from the open end of the shell, and to move it across the shell to said open end.

17. A plugging apparatus for plugging a conduit, comprising:
   (a) a plug shell having a closed end and an open end, and an interior defined by tapered walls;
   (b) an expander element contained within the plug shell interior and sealingly engageable to said tapered walls, said element being movable between the closed end and open ends of the shell when a force is applied thereto for wedgingly engaging said tapered interior walls and radially expanding the shell, and
   (c) an expansion means including a mandrel connected to a source of pressurized hydraulic fluid for conducting said fluid into the plug shell and thereby facilitating the movement of the expander element across the plug shell by spreading said tapered walls and reducing the amount of force necessary to move said element, wherein said mandrel is detachably connected to the expansion element, and includes a piston means in communication with said pressurized fluid for generating and applying a pulling force onto said expander element.

18. The apparatus of claim 17, wherein said mandrel conducts pressurized fluid between said expander element and the closed end of the plug shell, thereby applying a hydraulic force to the expander element that urges it to move toward the open end of the plug shell.

19. The apparatus of claim 18, wherein said hydraulic force is substantially sufficient to move the expander element toward the open end of the shell.

20. The apparatus of claim 18, wherein the mandrel applies a substantial pulling force to the expander element, and the pulling force in combination with the hydraulic force applied by the pressurized fluid is sufficient to move the expander element toward the open end of the shell.

21. The apparatus of claim 17, wherein said expansion means includes a sealing means for sealing the open end of the plug shell, and said mandrel of the expansion means conducts pressurized fluid only between the expander element and the sealed open end of the shell, and said mandrel applies a pulling force on said expander element of sufficient magnitude to overcome any net hydraulic forces urging the expander element toward the closed end of the shell, and to move said element toward the open end of the shell.

22. The apparatus of claim 17, wherein the expansion means includes a sealing means for sealing the open end of the plug shell, and said mandrel of the expansion means conducts pressurized fluid to the sections of the shell interior both between the expander element and the closed end of the shell, and the expander element and the sealed open end of the shell, and wherein said mandrel applies a pulling force of sufficient magnitude to move the expander element toward the sealed open end of the shell.

23. The apparatus of claim 22, wherein the cross-sectional area of the side of the expander element that faces the closed end of the shell is larger than the cross-sectional area of the side of the expander element that faces the sealed open end of the shell, so that the pressurized fluid applies a net hydraulic force on the expander element that urges it toward the sealed open end of the shell, and wherein this net hydraulic force in combination with the pulling force applied by the mandrel is sufficient to move the expander element toward the sealed open end of the shell.

24. The apparatus of claim 17, wherein the exterior of said shell is circumscribed by lands.

25. The apparatus of claim 17, wherein the exterior wall of the plug shell is frustro-conical, but wherein the outer diameter of the lands is substantially the same along the length of the plug shell.

26. A plugging apparatus for plugging a conduit, comprising:
 (a) a plug shell having a closed end and an open end;
 (b) an expander element contained within the interior of the shell and sealingly engaged therein that is movable across said shell between the closed end and open end thereof and that wedgingly engages the shell and radially expands it when so moved, and
 (c) an expansion means including both a source of pressurized hydraulic fluid for facilitating said movement of the expander element by conducting said fluid to the shell interior, thereby expanding the shell interior away from the expander element and relaxing the engagement therebetween, and a rod means detachably connectable to the expander element for applying sufficient pulling force to said element to move it across said shell.

* * * * *